United States Patent [19]

Andresen et al.

[11] Patent Number: 4,581,896

[45] Date of Patent: Apr. 15, 1986

[54] INFINITELY VARIABLE HYDRAULIC TRANSMISSION

[75] Inventors: Hans B. Andresen, Birkerod; Helmut K. Nielsen, Slangerup, both of Denmark

[73] Assignee: Alfa-Laval Separation A/S, Soborg, Denmark

[21] Appl. No.: 621,904

[22] PCT Filed: Oct. 26, 1983

[86] PCT No.: PCT/DK83/00099

§ 371 Date: Jun. 18, 1984

§ 102(e) Date: Jun. 18, 1984

[87] PCT Pub. No.: WO84/01804

PCT Pub. Date: May 10, 1984

[30] Foreign Application Priority Data

Oct. 29, 1982 [DK] Denmark ............................ 4821/82

[51] Int. Cl.$^4$ ............................................. F16H 39/16
[52] U.S. Cl. ......................................... 60/489; 60/494
[58] Field of Search .................................. 60/489, 494

[56] References Cited

U.S. PATENT DOCUMENTS 1,998,004  4/1935  Ernst .
2,176,401  10/1939  Johns ................................ 60/489 X
3,971,509  7/1976  Johnsen .

FOREIGN PATENT DOCUMENTS 1148426   5/1963   Fed. Rep. of Germany ........ 60/489
1960845   6/1971   Fed. Rep. of Germany .
431091    10/1911  France .
1032245   6/1953   France .
28499     12/1913  United Kingdom .

Primary Examiner—A. Michael Chambers
Assistant Examiner—John C. Fox
Attorney, Agent, or Firm—Bernard, Rothwell & Brown

[57] ABSTRACT

The transmission comprises a hollow input member (1) and a coaxial output member (2) supported for rotation relative to the input member. A positive displacement pump comprises a cylinder block (12) secured to the input member and a rotor (16) which is journalled on an eccentric pin (17) and which drives the pump pistons (15). A positive displacement motor comprises a stator part (6) secured to the input member and a rotor part (5) secured to the output member. The motor cylinders (8) are supplied with hydraulic liquid from the pump through duct means (35, 37, 39) in a disc-shaped control member (22) journalled on the eccentric pin (17) and rotating together with the pump rotor (16). Return flow from the motor to the pump occurs through a space (28) which within the input member surrounds the control member (22) and which communicates with each pump cylinder (14) during the suction stroke of the associated pump piston (15).

9 Claims, 11 Drawing Figures

INFINITELY VARIABLE HYDRAULIC TRANSMISSION

BACKGROUND OF THE INVENTION

This invention relates to an infinitely variable hydraulic transmission comprising: a hollow input member and an output member coaxial with the input member; a pump mounted within, and driven by, the input member and including a plurality of pump cylinders and pistons; a multi-cylinder motor mounted within the input member axially offset from the pump and having a stator part secured to the input member for rotation therewith, and a rotor part secured to the output member; and a control device for controlling the supply and return flow of hydraulic liquid from the pump to the motor and vice versa. The transmission is particularly, but not exclusively, suited for driving the internal conveyor screw of a decanter centrifuge, such as the centrifuge described in U.S. Pat. No. 3,971,509.

From French Pat. No. 1,032,245 there is known a transmission of the kind referred to having a variable displacement pump of the radial piston type. The pump comprises a stationary cylinder block with pistons held in engagement with a centrally located eccentric which rotates in synchronism with the input member. The motor is a constant displacement vane type motor having a rotor secured to the output member and a housing formed by a sleeve secured to the input member. The sleeve extends axially into sealing engagement with the outer surface of the stationary cylinder block of the pump, and in the sleeve there are formed two sets of radial ports aligned with the working chambers of the vane motor and the pump cylinders, respectively. Between a casing surrounding the sleeve and rotating together therewith and the outer surface of the sleeve there are defined two longitudinal ducts serving for the supply and return flow, respectively, of hydraulic fluid between the pump and the motor. The delivery rate of the pump, and hence the transmission ratio, may be altered by varying the eccentricity of the eccentric which drives the pump pistons.

In this known transmission large relative velocities occur between the mating cylindrical surfaces of the stationary pump cylinder block and of the sleeve, which latter rotates together with the input member. The concomitant wear of those surfaces in the course of time makes it virtually impossible to maintain a leak-free fit between the surfaces, which however is mandatory for ensuring the reliable function of the transmission.

SUMMARY OF THE INVENTION

It is an object of the present invention to provide a transmission of the kind referred to which does not suffer from the disadvantage of the known transmission. According to the invention, the transmission is characterized in that the pump cylinders are formed in a cylinder block secured to the input member and having, in its end face oriented towards the motor, ports arranged along a pitch circle with each port communicating with the working chamber of an associated pump cylinder, that in an end face of the rotor part of the motor, which is oriented towards the pump, ports are arranged along a pitch circle with each port communicating with the working chamber of an associated motor cylinder, that the control device is a disc-shaped member disposed between, and in sealing engagement with, said end faces and journalled on a stationary pin eccentrically offset from the axis of the transmission, the control member being coupled to the cylinder block of the pump so as to rotate therewith in a orbital motion determined by the eccentricity of the pin, that the control member has a first end face abutting against said end face of the pump and formed with a control land which cooperates with the opposed ports of the pump such that during one revolution of the input member each port is alternately connected to a supply duct extending through the control member and to a space which internally of the input member surrounds the control member, and that the control member has a second end face abutting against said end face of the motor and having a pair of arcuate grooves which cooperate with the ports in the end face of the motor, said pair of grooves comprising a first groove connected to the supply duct and a second groove connected to the space within the input member.

Because the disc-shaped control member rotates together with the pump cylinder block and performs only a small orbital motion relative thereto, the relative velocities of the mating, flat surfaces of the control member and the cylinder block are correspondingly low so that the wear on the surfaces is negligible, even after prolonged operation of the transmission, and the sealing contact between the surfaces remains substantially leak-free.

According to a preferred feature of the invention said end face of the rotor part of the motor is provided on an intermediate disc supported by the output member for rotation therewith, but axially displaceable thereon, and subjected to an axial force directed towards the control member and exerted by the hydraulic pressure prevailing in the motor cylinders. This feature ensures that during operation suitable axial forces can always be maintained between each end face of the control member and the opposed, ported faces of the pump and motor, which results in a perfect sealing contact irrespective of possible wear on the faces.

A first embodiment of the invention is characterized in that said first end face of the control member is circular with an outer diameter equal to the diameter of an imaginary circle, which externally envelopes the ports in the pump end face, and that the outer periphery of the first end face of the control member forms the outer borderline of the control land which is shaped as an annulus having a radial width equal ot the radial dimension of the ports in the pump end face.

The orbital motion performed by the control member relative to the pump cylinder block during each revolution of the cylinder block causes the control land to move radially across each port in the cylinder block so as to connect that port to the supply duct during the delivery stroke of the associated pump piston and to the return flow passage formed by the surrounding space during the suction stroke.

A second embodiment of the invention is characterized in that the control member is composed of two disc-shaped parts which are angularly adjustable relative to one another, and that the first and second end faces of the control member, which cooperate with the ports of the pump and the motor, respectively, are provided on the first and second part, respectively, and that the control land on the first end face of the control member is composed of a plurality of arcuate land sections, each cooperating with one port and having a constant radial width equal to the radial dimension of the ports, while the radius from the outer contour of the land section to the centre of the control member decreases from a maximum value occurring at one end of the land section and equal to the radius of a circle which externally envelopes the ports, to a minimum occurring at the other end of the land section and substantially equal to the radius of a circle which internally envelopes the ports.

While in this latter embodiment the control member is slightly more complicated than in the first embodiment, if offers the advantage that both the pump and the motor can be of the constant displacement type, because the variation of the transmission ratio is effected by the angular adjustment of the two parts of the control member. In that relative end position of said parts, in which each port in the pump cylinder block cooperates with that end of the land section, where the value of the radius is maximum, the control member functions in the same manner as the one-piece control member of the first embodiment so that during the entire pump stroke each pump cylinder communicates, via a supply duct, with the motor, while during the entire suction stroke it communicates with the surrounding space. In this position the motor, and thus the output member, rotates at its maximum rate of revolution relative to the input member. In the opposite relative end position all ports will always, or substantially always, be located outside the outer contour of the land section and thus connected to the return flow passage. Consequently the entire, or at least the majority of, the liquid expelled from each pump cylinder during the delivery stroke will by-pass the motor. In this position the relative rate of revolution of the output member assumes its zero or minimum value. By adjusting the two-part control member to an intermediate angular position the relative rate of revolution of the output member, and thus the transmission ratio, may be adjusted to any desired intermediate value.

BRIEF DESCRIPTION OF THE DRAWINGS

The invention will now be described in more detail by way of two embodiments illustrated in FIGS. 1 to 5 and 6 to 11, respectively, of the accompanying schematical drawings, wherein.

DETAILED DESCRIPTION

Figure 1:
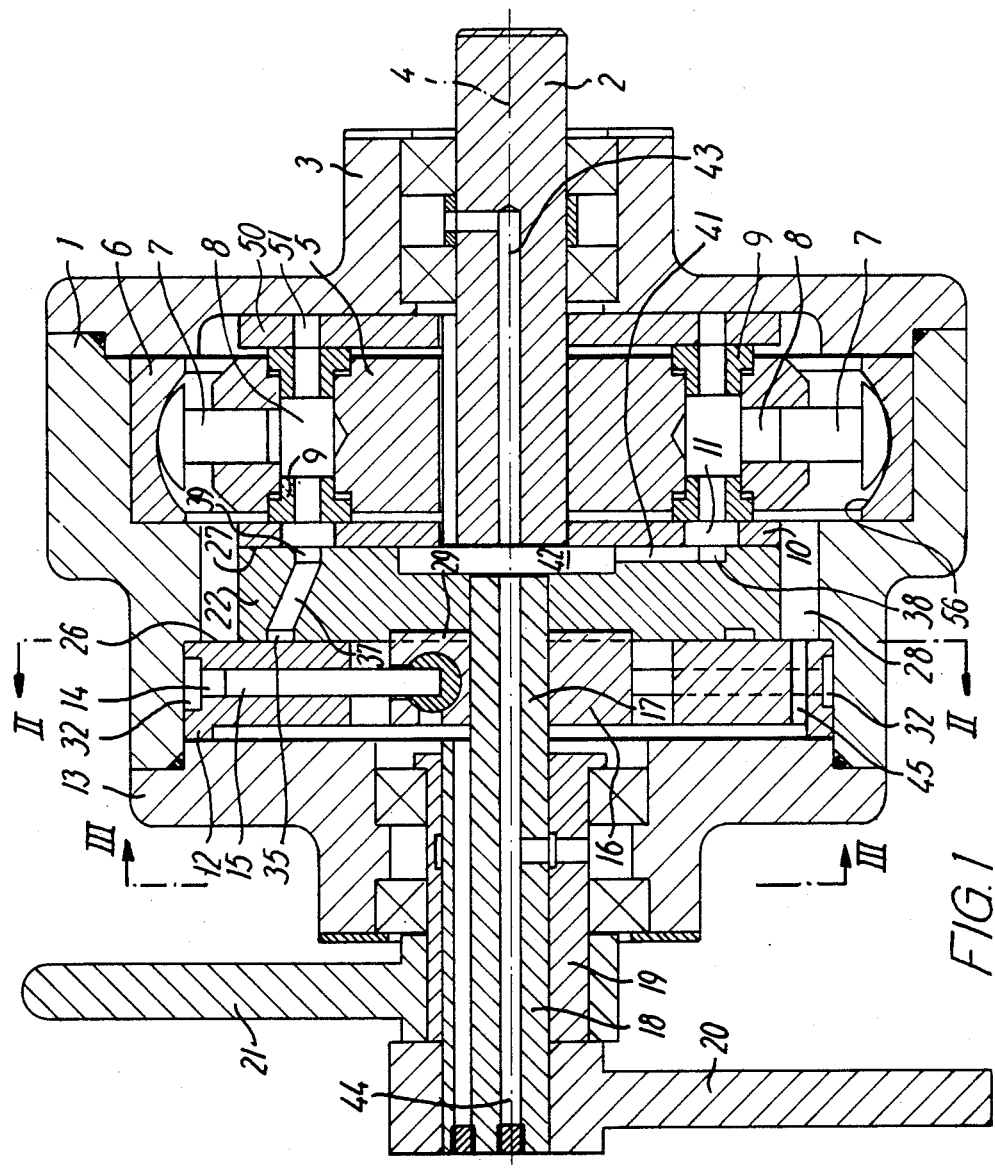
FIG. 1 is a longitudinal section through the first embodiment of the invention, comprising a constant displacement motor and a variable displacement pump which latter is shown adjusted to zero delivery.

The hydraulic transmission shown in FIGS. 1 to 5 comprises a housing 1, which in a manner not shown in detail is supported for rotation by a frame (not shown) and which constitutes the input member of the transmission. Housing 1 may be belt-driven from a motor mounted on the frame. By means of two roller or ball bearings a shaft 2, which constitutes the output member of the transmission, is supported for rotation relative to an end cover 3 of housing 1. Members 1 and 2 rotate about a common axis 4.

The transmission comprises a constant displacement, radial piston hydraulic motor, the rotor part (cylinder block) 5 of which is secured to shaft 2 while its stator part 6 is secured in an eccentric bore in housing 1. The inner surface 56 of stator 6 is formed as an annular contact face cooperating with the end faces of the motor pistons 7. Each motor piston, of which there are seven in the embodiment shown, can reciprocate radially in an associated cylinder 8 formed in the rotor part 5. A bore extends parallel to axis 4 from the radially innermost end of each cylinder 8 and accommodates a bushing 9 which, under the influence of the hydraulic pressure prevailing in the motor cylinder during operation of the transmission, is held in sealing contact with one lateral face of an intermediate disc 10 slidably mounted on shaft 2 so as to rotate together with rotor part 5. A port 11 extends transversely through disc 10 in alignment with each bushing 9 and ports 11 serve alternately for permitting inflow and outflow of hydraulic liquid into and out of the cylinders 8.

Figure 2:
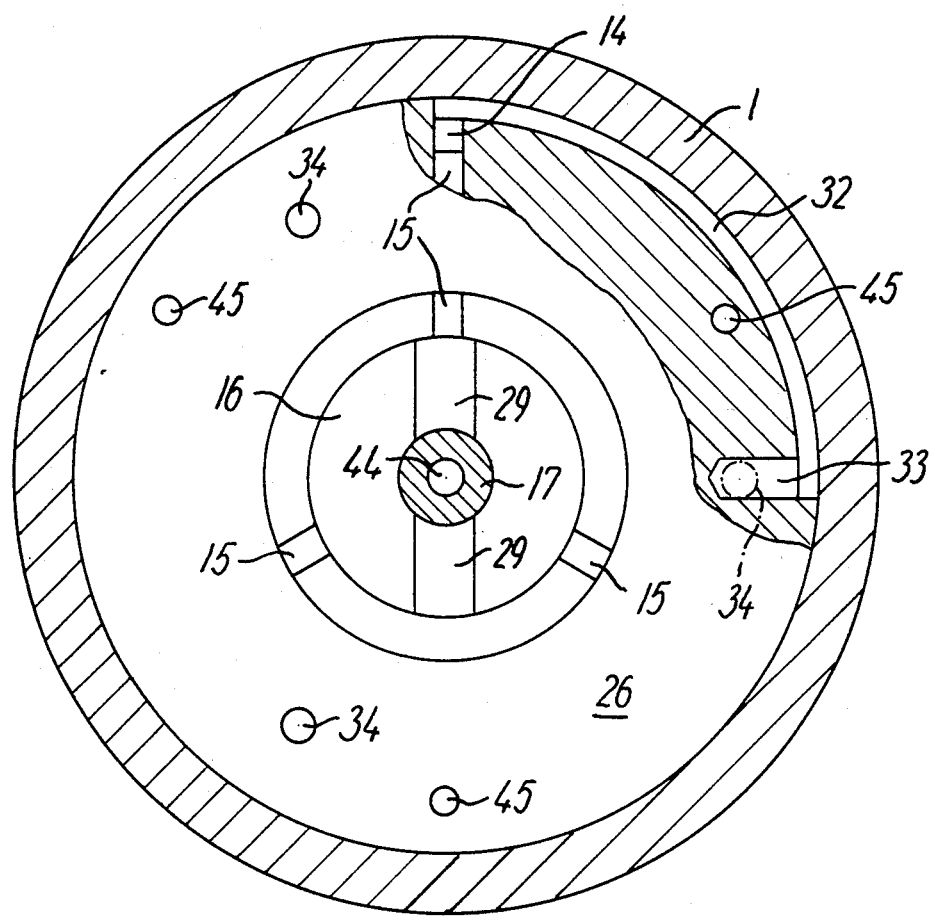
FIG. 2 is a section along line II—II of FIG. 1.
Figure 3:
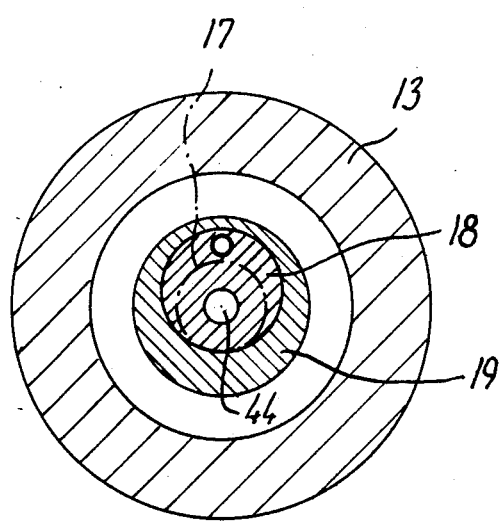
FIG. 3 is a section along line III—III of FIG. 1.
Figure 4:
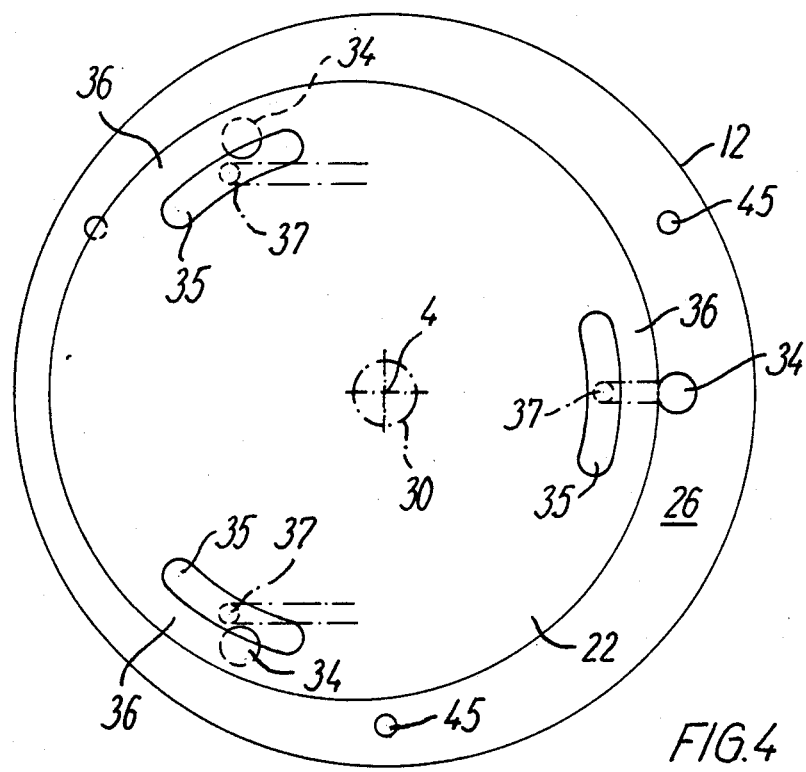
FIG. 4 is a plan view showing the opposed, cooperating "valving" faces on the cylinder block of the pump and on the control member, when the pump is set to maximum delivery.

The transmission further comprises a variable displacement, radial piston hydraulic pump having a cylinder block 12 secured coaxially with axis 4 in a bore in housing 1 immediately behind the other end cover 13 of the housing. Cylinder block 12 contains three radially extending cylinders 14 each accommodating a pump piston 15. At their radially innermost ends the pump pistons are drivingly coupled to a rotor 16 journaled on a cylindric pin 17. Pin 17 is integral with one end of a cylindric adjustment shaft 18, which protrudes through end cover 13, and which is journalled in an eccentric bore in a sleeve 19, which in turn is supported in end cover 13 by means of two roller or ball bearings. The centre line of sleeve 19 coincides with axis 4. As seen in FIG. 3 pin 17 is eccentric relative to shaft 18, and in the described embodiment its eccentricity is the same as the eccentricity of the bore through sleeve 19 which accommodates shaft 18. Two adjustment handles 20 and 21 are secured to shaft 18 and sleeve 19, respectively, and one of the handles is rigidly secured to the frame (not shown). By a relative rotation of handles 20 and 21 the offset or eccentricity of pin 17 relative to axis 4 can thus be adjusted between the value zero, as shown in FIG. 1–3, and a maximum value shown in FIGS. 4 and 5. When the desired eccentricity, which determines the stroke of the pump pistons 15, has been adjusted handles 20 and 21 are locked together.

A circular, disc-shaped control member 22 is mounted in the space 28 defined within housing 1 between the pump and the motor, and its opposed end faces are in sealing contact with one each of the opposed end faces 26 and 27, respectively, of the pump cylinder block 12 and the intermediate disc 10. Control member 22 is journalled on the eccentric pin 17 and is drivingly coupled to the pump rotor 16 by means of dogs 29 provided on the end face of the rotor, see also FIG. 2, and engaging in complementary recesses in the control member. When the eccentricity of pin 17 has been set or adjusted, by means of handles 20 and 21, to a value different from zero, member 22 performs, during the rotation of housing 1, an orbital or planetary motion relative to cylinder block 12. During one revolution of housing 1 the centre of member 22 moves once around the circle 30 shown in FIG. 4, without noticeably changing the orientation of member 22 relative to the cylinder block, which latter rotates in synchronism with rotor 16 except for the minimal periodic deviations due to the eccentricity.

Figure 5:
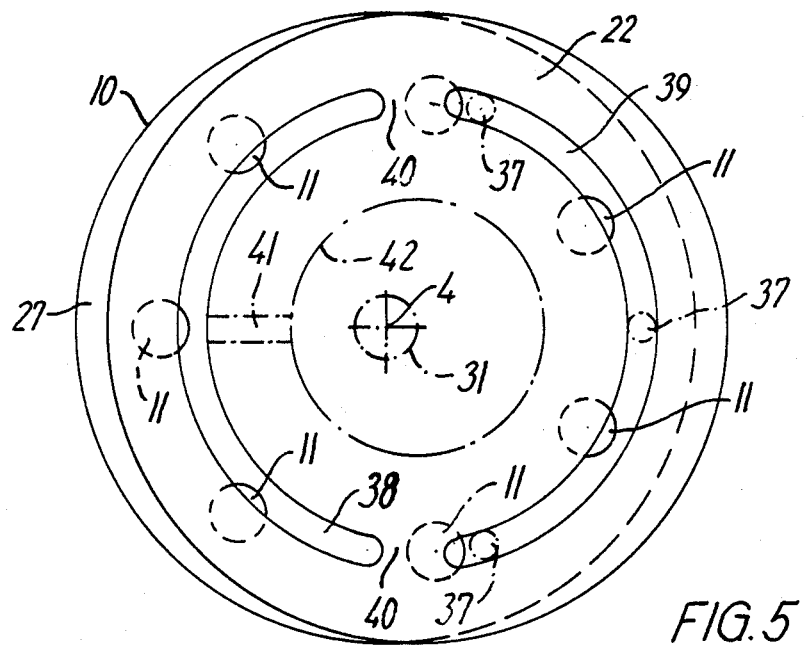
FIG. 5 is a plan view, similar to FIG. 4 and showing the valving faces on the rotor part of the motor and on the control member.

The control member performs the same orbital motion relative to disc 10, which in FIG. 5 has been indicated by a circle 31, but this motion is superposed on a mutual or relative rotation of parts 22 and 10 about axis 4 due to the relative rotation of parts 5 and 6 when the eccentricity of pin 17 is different from zero.

From the radially outermost end of each pump cylinder 14 issues an arcuate groove 32 in the peripheral surface of cylinder block 12. Through groove 32 and a short radial bore 33 at the opposite end of the groove cylinder 14 communicates with a port 34 in the end or "valving" face 26 of the cylinder block. Each port 34 is offset 90° from the associated pump cylinder 14 (see FIG. 2).

In that end or valving face of control member 22, which abuts against face 26 there are provided three arcuate grooves 35 spaced 120° from one another. Each groove 35 cooperates with one port 34. The diameter of the circular member 22 is equal to the diameter of an imaginary circle which externally envelopes the three ports 34, and the width of the annular area or land 36 defined between the periphery of member 22 and the outer contours of grooves 35 is equal to the diameter of the circular ports 34. Thus when the eccentricity of pin 17 is set to zero, then land 36 only just obturates all ports 34 whereas when an eccentricity different from zero has been set so that member 22 performs an orbital motion as described above and illustrated in FIG. 4, then each port 34 is caused to communicate alternately with space 28 surrounding the control member and with its associated arcuate groove 35.

A bore 37 issues from the bottom of each groove 35, see also FIG. 1, and at the opposed end or valving face of the control member all bores 37 open into a common arcuate groove 39, the mean diameter of which is equal to the diameter of the pitch circle on which ports 11 are located in the end or valving face 27 of disc 10. The arcuate length of groove 39 is slightly less than 180°, see FIG. 5. Through bores 37 pressurized hydraulic liquid flows from that or those cylinders 14 in which piston 15 executes an outwardly directed delivery stroke, to groove 39.

In the just mentioned valving face of control member 22, which abuts against valving face 27 there is provided a further arcuate groove 38 having the same mean diameter as groove 39 and also an arcuate length of slightly less than 180°. The radial width of grooves 38 and 39 has been chosen such that each port 11 communicates always with one of the grooves, apart from those brief moments, in which the motion of the associated motor piston 7 is reversed. At these moments the port 11 in question is obturated by one of the areas 40 located between opposed ends of grooves 38 and 39 on the valving face of the control member.

In radial bore 41 in control member 22 connects groove 38 with a central chamber 42 defined between the control member and the intermediate disc 10. Through ducts 43 and 44 in shafts 2 and 18 chamber 42 communicates with the bearings in end covers 3 and 13 and from the last-mentioned bearings hydraulic liquid can flow back to space 28 through ducts 45 traversing the pump cylinder block 12.

Between the motor rotor 5 and the end cover 3 a disc 50 is slidably mounted on shaft 2 for rotation therewith. Bores 51 extend axially through disc 50 in alignment with each of the bushings 9, which are mounted in the opposed face of rotor 5 opposite those bushings 9 which cooperate with disc 10. Bores 51 ensure the formation of a lubricating film between disc 50 and end cover 3 and provide an equalization of the axially directed forces acting on rotor 5.

When housing 1 rotates, and pin 17 has been adjusted to an eccentricity different from zero each pump piston 15 performs one complete reciprocatory movement in its cylinder 14 during each revolution of housing 1. During the delivery stroke of the piston the cylinder communicates with one of the grooves 35 in control member 22 through the associated peripheral groove 32 and port 34. From groove 35 the liquid flows through the associated bore 37 into the arcuate groove 39 in the control member and from there into those motor cylinders 8, which through their ports 11 communicate with groove 39. The pistons 7 in those cylinders are urged outwardly, thereby causing the rotor part 5 and output shaft 2 to rotate relative to housing 1. From those motor cylinders 8, in which simultaneously the pistons move inward, the liquid is expelled through the associated ports 11 into groove 38 from where it flows to chamber 42, onward to the bearings and finally into space 28. From that space the pump piston or pistons 15, which perform a return or suction stroke, suck liquid through the port or ports 34, which then are fully or partly open, see FIG. 4.

To each adjusted value of the eccentricity of pin 17 there corresponds a different delivery rate of hydraulic fluid from the pump to the motor and thus a different rate of rotation of rotor 5 relative to stator 6. Thus by altering the eccentricity one is able to continuously alter the transmission ratio.

Because the pump cylinders draw liquid from space 28, in which the liquid rotates together with housing 1 and thus is subjected to a centrifugal force, a certain positive pressure prevails at the suction side of the cylinders which ensures that the cylinders are completely filled.

In FIGS. 6 to 11 those components of the transmission, which correspond to components of the first embodiment, have been designated by the same reference numerals with 100 added, and they will only be described below to the extent they differ, as to their construction and/or function, from the components of the first embodiment.

Figure 9:
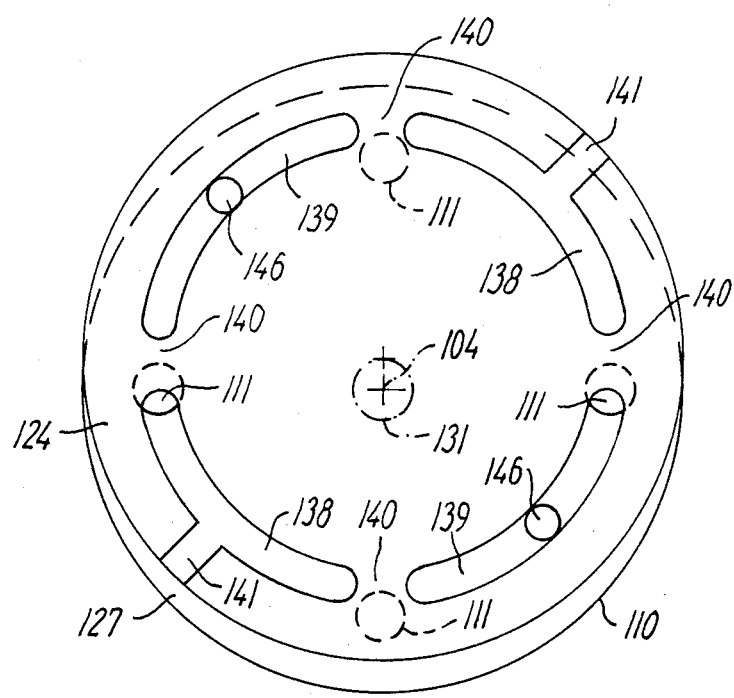
FIG. 9 is a plan view similar to FIG. 5 showing the opposed valving faces on the rotor part of the motor and on the control member, the latter being rotated through approximately 45° from its position shown in FIG. 6, and FIGS. 10 and 11 illustrate the mechanism for adjusting the delivery of the pump.

While the contact face 56 of stator 6 is a surface of revolution having its axis offset from axis 4, so that during each revolution of rotor 5 relative to stator 6 each piston 7 performs one complete working cycle in its cylinder 8, contact face 156 is concentric with axis 104 and a section through the face normally to axis 104 is oval. Each piston 107 thus performs two complete working cycles each time rotor 105 performs one full revolution relative to stator 106. The hydraulic motor shown if FIG. 6 comprises four cylinders 108. Accordingly, FIG. 9 shows four ports 111 in the intermediate disc 110 and two pairs of arcuate grooves 138, 139 in the opposed valving face of the control member.

The hydraulic pump comprises three cylinders and pistons 114, 115, the pistons being driven by a rotor 116 journalled on a eccentric pin 117. Pin 117 is integral with a shaft 118 which, contrary to shaft 18, is journalled directly in end cover 113. The eccentricity of pin 117 and hence the delivery of the pump is thus constant. In operation shaft 118 is rigidly connected, through arm 120 secured to the shaft, with the frame (not shown) of the transmission.

Figure 6:
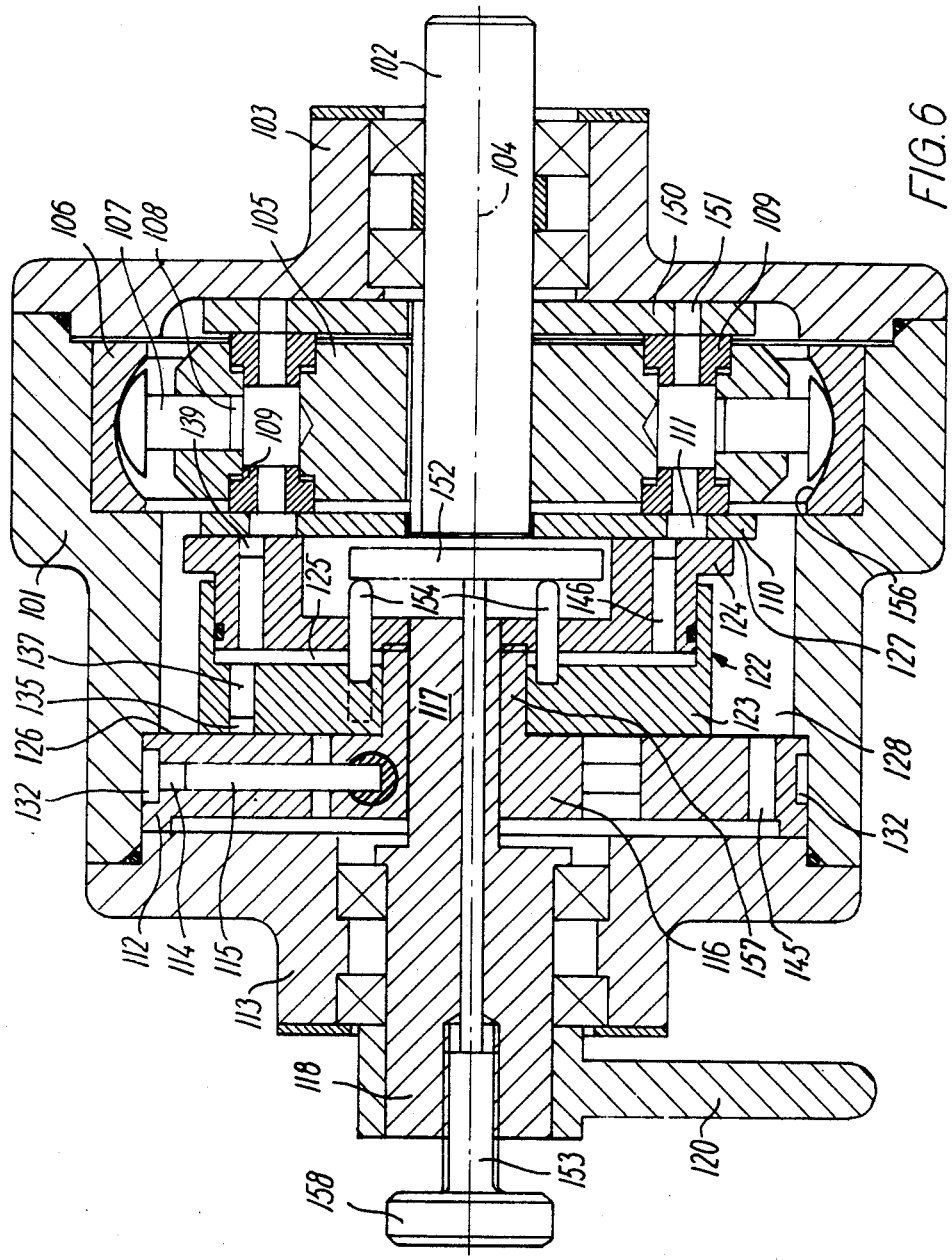
FIG. 6 is a longitudinal section similar to FIG. 1 through the second embodiment of the invention, comprising a constant displacement motor, a constant displacement pump, and a two-part control member designed to vary the transmission ratio.
Figure 7:
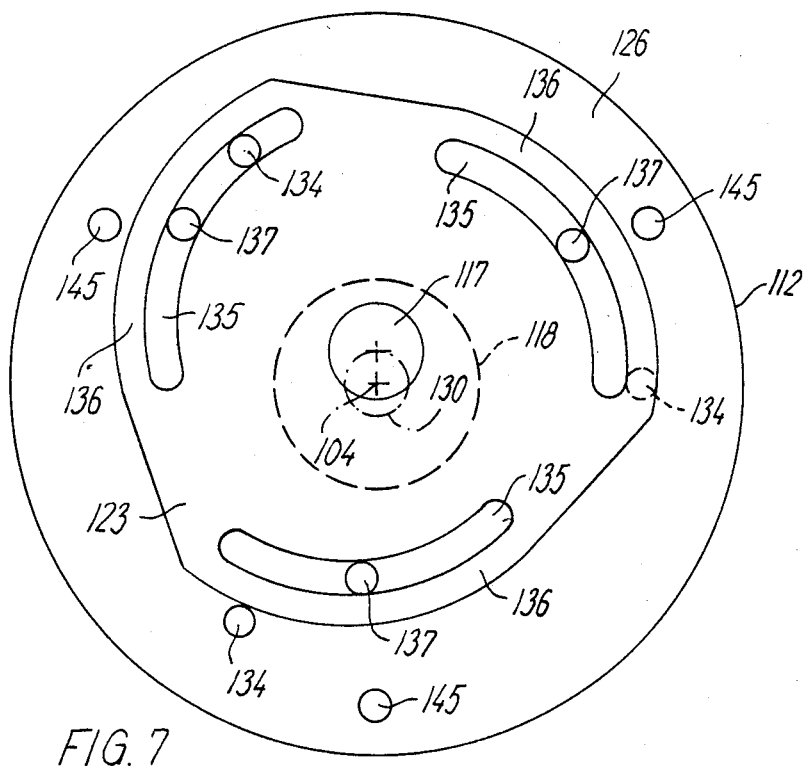
FIG. 7 is a plan view, similar to FIG. 4 and showing the opposed valving faces on the cylinder block and on the control member when the latter is adjusted for maximum delivery from the pump to the motor.

In this second embodiment the control member 122 provided between the pump and the motor is composed of two disc-shaped parts 123 and 124, which are angularly adjustable relative to one another for varying the transmission ratio. The left-hand end face, as seen in FIG. 6, of disc 123 is in sealing contact with the valving end face 126 of the pump cylinder block 112, see FIGS. 7 and 8, and the right-hand end face of disc 124 is in sealing contact with the valving face 127 on disc 110, see FIG. 9. Disc 123 is journalled on a cylindric hub 157 of rotor 116, which hub is coaxial with pin 117. Accordingly, disc 123 performs, during each revolution of housing 101, the same orbital motion relative to cylinder block 112 as the motion of control member 22 described above. In FIG. 7 this motion has been illustrated by the dot-and-dash circle 130. Disc 124 is secured to the end face of hub 157, e.g. by cap screws not shown, and thus performs the same motion as disc 123.

A chamber 125 is defined between discs 123 and 124 and sealed from the space 128 surrounding control member 122 by an O-ring mounted in an annular groove in disc 124. Chamber 125 communicates, through bores 137 in disc 123, with three arcuate grooves 135 spaced 120° in the valving face of disc 123 and each cooperating with one of the three ports 134 in valving face 126, see FIGS. 7 and 8. Through diametrically opposed bores 146 in disc 124 chamber 125 communicates with two diametrically opposed arcuate grooves 139 in the valving face of disc 124. Two arcuate grooves 138 intermediate grooves 139 communicate with space 128 through radial grooves 141 extending from each groove 138 to the periphery of disc 124. Each of the concentric grooves 138, 139 is somewhat shorter than 90°, and is in the first embodiment the areas 140 located between opposed ends of adjacent grooves 138 and 139 are capable of substantially covering a port 111 in disc 110 each time the associated motor piston 107 is in one of its end positions, see FIG. 9.

The orbital motion of disc 124 relative to intermediate disc 110, which in FIG. 9 has been illustrated by a dot-and-dash circle 131, is the same as that performed by control member 22 in the first embodiment. In any given moment pressurized hydraulic liquid flows from chamber 125 through bores 146 and grooves 139 into the two diametrically opposed motor cylinders 108, the ports 111 of which communicate with grooves 139, thereby urging the pistons 107 in those cylinders outwardly while liquid from the two other cylinders 108 is expelled to space 128 through grooves 138 and 141.

Figure 10:
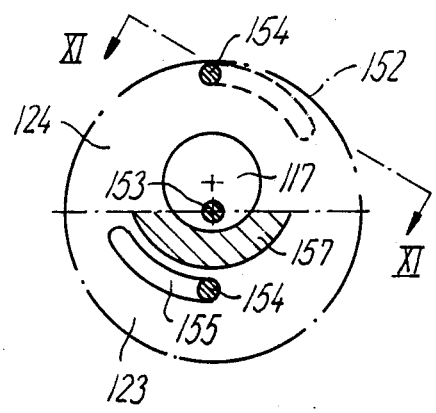
Figure 11:
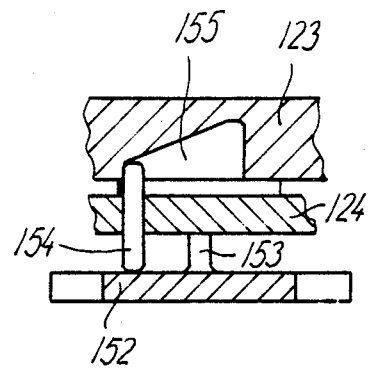

The mechanism for adjusting the relative angular positions of discs 123, 124 will now be described with reference to FIGS. 10 and 11. The upper half of FIG. 10 is a section perpendicular to axis 104 immediately to the right, in FIG. 1, of pin 117, while the lower half of FIG. 10 is a similar section within chamber 125. FIG. 11 is a section along line XI—XI of FIG. 10.

Figure 8:
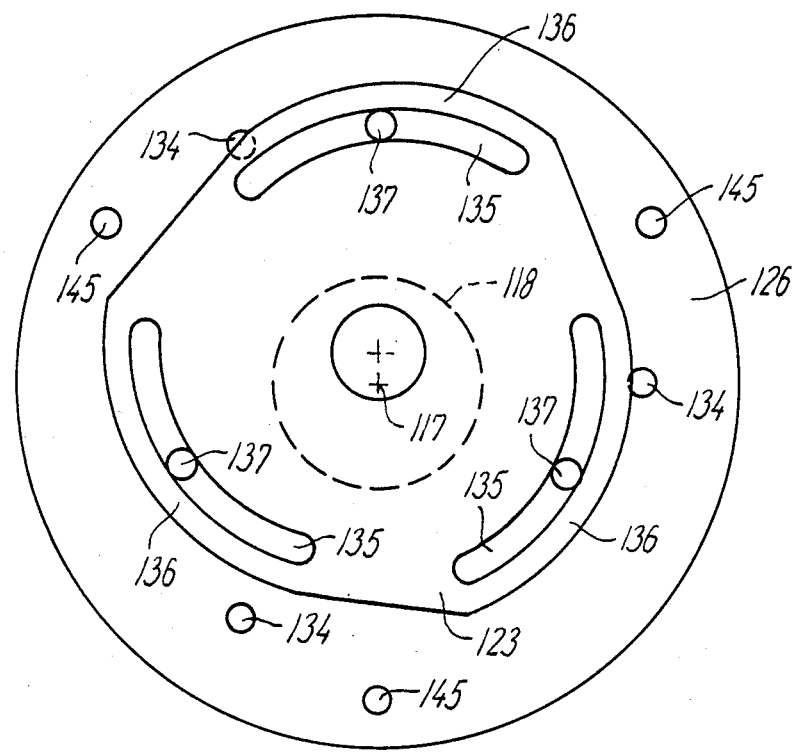
FIG. 8 is a plan view showing the same components parts as FIG. 7 but with the control member adjusted for zero delivery from the pump, as also shown in FIG. 6.

A disc 152 located in the interior of disc 124 is secured to a spindle 153, which extends through an axial bore in pin 117 and shaft 118 and which at its outer end is formed with a thread engaging in an internal thread in shaft 118 and an integral knob 158. By rotating spindle 153 disc 152 can be displaced axially towards or away from the end face of pin 117. Two pins 154 extend with a sliding fit through diametrically opposed bores in disc 124 into arcuate grooves 155 in disc 123. Grooves 155 are concentric with pin 117 and the depth of each groove varies continuously between its ends, as shown in FIG. 11. An axial displacement of pins 154 effected by a displacement of disc 152 against which the outer ends of the pins abut while their inner ends abut against the bottom of the respective groove 155, thus results in an angular adjustment of disc 123 relative to disc 124 and hence relative to the ports 134 in the valving face 126 of the pump. FIGS. 7 and 8 show the respective extreme positions of disc 123 corresponding to maximum and zero delivery to the hydraulic motor, respectively.

In contrast to grooves 35 which are concentric with control member 22, each groove 135 curves inwardly towards the centre of disc 123 from one end to the other. Between the outer contour of each groove 135 and the periphery of disc 123, which has a corresponding curvature, there is defined an arcuate control or valving land 136 of constant radial width equal to the diameter of the associated port 134 but with a mean radius from the centre of disc 123, which decreases from one end of the land to its opposite end.

In the relative position of disc 123 shown in FIG. 7, which as stated corresponds to maximum delivery, the function of the disc is exactly as described above with reference to control member 22 of the first embodiment when pin 17 has been set to maximum eccentricity. During the entire delivery stroke of each pump piston 115 its cylinder communicates with the associated groove 135 while during the suction stroke its port 134 is fully or partly open towards space 128 surrounding disc 123 and cut off from groove 135 by the land 136.

In the other extreme position of disc 123 shown in FIG. 8 each port 134 is located adjacent that end of the associated groove 135 and land 136 having the minimum radius and it will be seen that in this position the port communicates with space 128 during both the delivery and the return stroke of the pump piston. Thus the entire delivery of the pump bypasses the motor and is returned, through space 128, to those pump cylinders which perform a suction stroke. Since no hydraulic liquid is delivered to the motor, there is no relative rotation between its stator and rotor, which thus rotate in synchronism and at the same rpm as the input member 101.

The adjustment of discs 123, 124 to a relative angular position intermediate the extreme positions shown in FIGS. 7 and 8 results in a partial by-pass of the motor, so that it is possible to effect a continuous variation of the relative rpm of the motor and thus of the transmission ratio.

We claim:

1. An infinitely variable hydraulic transmission comprising:

a hollow input member supported for rotation about an axis of the transmission;

an output member coaxial with the input member;

a hydraulic pump mounted within the input member and including a cylinder block secured to the input member, a plurality of pump cylinders formed in the cylinder block, a pump piston reciprocally received within each pump cylinder and defining therewith a working chamber, and means for reciprocating said pump pistons in timed relationship with the rotation of the input member;

a multi-cylinder hydraulic motor mounted within the input member axially spaced from the pump and including a stator part secured to the input member for rotation therewith, and a rotor part secured to the output member, a pluarlity of motor cylinders formed in the rotor part, and means associated with each motor cylinder for defining a working chamber therewith, and for cooperating with the stator part in response to hydraulic pressure in the associated working chamber to urge rotation of the rotor part relative to the stator part;

said pump cylinder block having an end face oriented towards the motor, and a plurality of first ports arranged along a pitch circle on said end face with each port communicating with the working chamber of an associated pump cylinder of the plurality of pump cylinders;

said rotor part of the motor having an end face oriented towards the pump, and a plurality of second ports arranged along a pitch circle on said end face with each port communicating with the working chamber of an associated motor cylinder of the plurality of motor cylinders;

a stationary pin eccentrically offset from the axis of the transmission;

a disc-shaped control member disposed in the interior of the input member between the pump and the motor and journalled on the stationary pin;

drive means coupling the control member to the cylinder block of the pump so as to cause the control member to perform an orbital motion in quasi-synchronism with the rotation of the cylinder block;

said control member having supply duct means extending therethrough and having a first end face sealingly abutting against said end face of the pump cylinder block and formed with a control land which is opposed to and cooperates with the first ports such that during each complete revolution of the input member each first port is alternately connected to the supply duct means extending through the control member and to the interior of the input member surrounding the control member; and said control member having a second end face sealingly abutting against said end face on the rotor part of the motor and having a pair of arcuate grooves which are opposed to and cooperate with the second ports, said pair of grooves comprising a first groove connected to the supply duct and a second groove connected to the interior of the input member.

2. A transmission as claimed in claim 1, wherein said end face on the rotor part of the motor is provided on an intermediate disc supported by the output member for rotation therewith, but axially displaceable relative thereto, and subjected to an axial force directed towards the control member and exerted by the hydraulic pressure prevailing in the motor cylinders.

3. A transmission as claimed in claim 1, wherein said first end face of the control member is circular with an outer diameter equal to the diameter of an imaginary circle which externally envelops the first ports in the end face of the pump cylinder block, and said control land is shaped as an annulus outwardly defined by the outer periphery of said first end face and having a radial width equal to the radial dimension of the first ports.

4. A transmission as claimed in claim 3, wherein a plurality of third arcuate grooves, equal in number to the number of first ports, is formed in said first end face of the control member, and a separate supply duct leads from each third groove to the first groove in the second end face of the control member, and the outer contours of the third grooves define the inner borderline of the control land.

5. A transmission as claimed in claim 1, wherein said first and second arcuate grooves have a common mean diameter equal to the pitch circle diameter of the opposed second ports, and the angular length of each groove is somewhat less than 180°.

6. A transmission as claimed in claim 5, wherein the angular length of each of the areas defined between opposed ends of the first and second grooves is equal to the tangential dimension of a second port.

7. A transmission as claimed in claim 1, comprising bearings supporting the input member at the pump end and motor end, respectively, a central chamber defined by the control member, passage means connecting the second arcuate groove with the central chamber, ducts extending from the central chamber through the output member and through the stationary pin to the bearings, and ducts transversing the cylinder block of the pump and connecting the bearing at the pump end with the interior of the input member.

8. A transmission as claimed in claim 1, wherein the control member is composed of first and second disc-shaped parts which are angularly adjustable relative to one another, and the first and second end faces of the control member which cooperate with the first and second ports, respectively, are provided on said first and second parts, respectively; and the control land on the first end face of the control member is composed of a plurality of arcuate land sections, each cooperating with one first port and having a constant radial width equal to the radial dimension of the first ports, while the radius from the center of the control member to the outer contour of each land section decreases from a maximum value occurring at one end of the land section and equal to the radius of a circle which externally envelops the first ports, to a minimum occurring at the other end of the land section and substantially equal to the radius of a circle which internally envelops the first ports.

9. A transmission as claimed in claim 8, wherein each land section is defined inwardly by the outer contour of a third arcuate groove in the first end face, an interior chamber is defined between the first and second parts of the control member, a plurality of ducts, equal in number to the number of third arcuate grooves, extend through the first part of the control member, each said duct connecting the interior chamber with an associated third groove, a duct extends through the second part of the control member and connects the first arcuate groove in the second end face of the control member with the interior chamber, and the second arcuate groove in said second end face communicates directly, through a groove in the second end face, with the interior of the input member.

* * * * *